Feb. 13, 1962 J. MAKSYMIAK ET AL 3,021,041
WEB GUIDING MECHANISM
Filed May 7, 1958
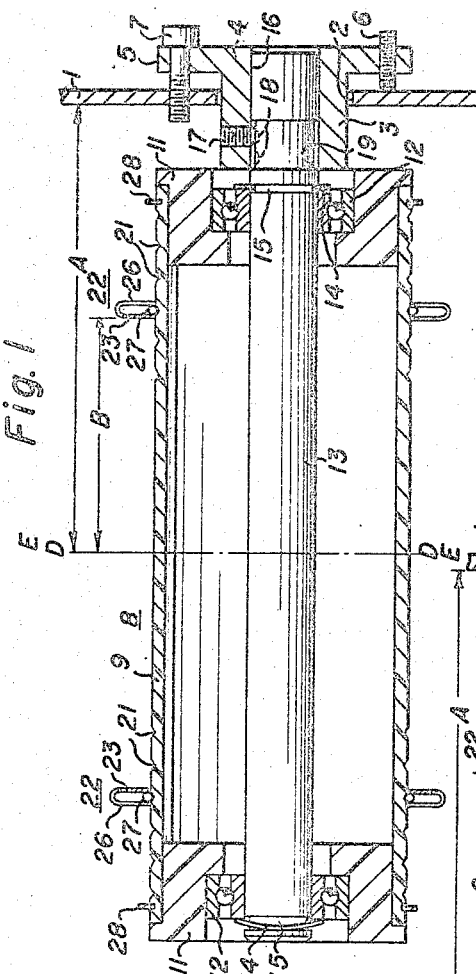
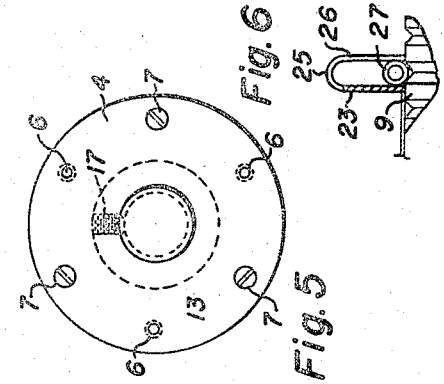
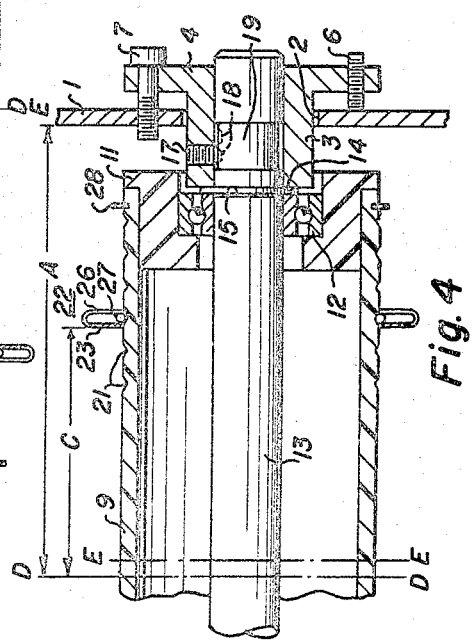
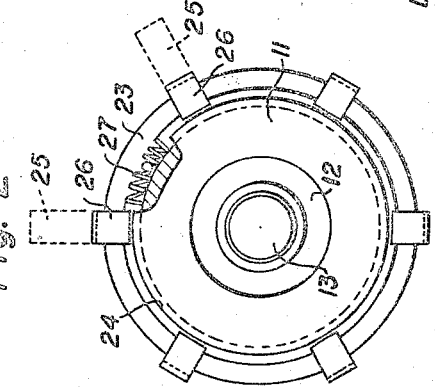
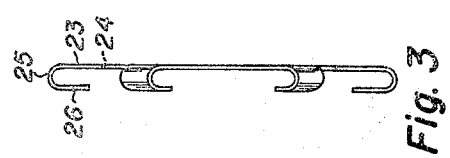
JOHN MAKSYMIAK
JOHN S. POLLOCK
INVENTORS
BY R. Frank Smith
Steve W. Gremban
ATTORNEYS

United States Patent Office 3,021,041
Patented Feb. 13, 1962

3,021,041
WEB GUIDING MECHANISM
John Maksymiak and John S. Pollock, Rochester, N.Y., assignors to Eastman Kodak Company, Rochester, N.Y., a corporation of New Jersey
Filed May 7, 1958, Ser. No. 733,556
4 Claims. (Cl. 226—199)

This invention relates generally to web guiding mechanisms, and more specifically to a guide roller device for guiding a continuous strip of photographic paper in a color printer.

When a photographic paper is fed from a supply roll of a printer across an aperture through which a photographic image is transmitted upon the paper, there is a tendency of the paper to weave sidewise and to become laterally misaligned causing the photographic image to not be properly centered on the paper. This objection is obviated by this invention which provides novel spaced apart guide plates mounted on a cylinder which is axially movable into one of two predetermined positions.

One of the primary objects of this invention is to provide a guide roller mechanism that eliminates any weaving in the photographic paper and properly aligns it with respect to the aperture so that the photographic image is properly centered thereon.

Another object of the present invention is to provide a guide roller mechanism that is laterally adjustable to accommodate photographic paper increasing in width in multiples of ¼ inch while still maintaining the longitudinal center line of the paper in the same predetermined position.

Still another object of the present invention is the provision of an axially movable guide plate for a guide roller mechanism that is of simple design and construction, thoroughly reliable, and economical to manufacture.

Objects and advantages other than those set forth above will be apparent from the following description when read in connection with the accompanying drawing, in which;

FIG. 1 is a side elevation view in section of the guide roller mechanism of this invention in one predetermined position;

FIG. 2 is an end view of the structure of FIG. 1 and has a portion thereof broken away to show the spring;

FIG. 3 is a side elevation view of the guide plate of FIG. 2;

FIG. 4 is a segmental view of the structure of FIG. 1 with the roller axially moved to the other predetermined position to accommodate a photographic paper of different width;

FIG. 5 is an end view of the structure of FIG. 4; and

FIG. 6 is an enlarged, segmental view partially in section of a portion of the guide plate.

As shown in the drawing, a mounting plate 1 of the photographic printer, not shown, is provided with an opening 2 for loosely receiving the hub 3 of a bushing 4. The bushing 4 has a circular flange 5 carrying three setscrews 6 adapted to engage the mounting plate 1 for a purpose to be explained hereinafter. The flange 5 further carries three cap screws 7 engaging threaded openings in the plate 1 to rigidly secure the bushing 4 thereto.

A roller 8 is provided having a cylinder 9 adapted to receive a hub member 11 at each end which is pressed fitted therein to rigidly secure the hub members 11 to the cylinder 9. Each of the hub members 11 carries a bearing 12, and the cylinder 9, hub members 11 and bearings 12 are rotatably mounted as a unit on a shaft 13 and retained thereon by means of locking members 14 disposed in grooves 15 formed by the shaft 13. One end of the shaft 13 is slidably mounted in the bore 16 of the bushing 4, and a setscrew 17 carried by the bushing 4 engages recesses 18 in a necked-down portion 19 of the shaft 13 to selectively lock the shaft 13 to the bushing 4 in one of two positions. Before the cap screws 7 are tightened to secure the bushing 4 to the mounting plate 1, the set screws 6 are adjusted to properly position the bushing 4 so that the shaft 13 and cylinder 9 carried thereby are properly positioned to guide the photographic paper correctly with the longitudinal center line D—D of the paper in a fixed position relative to the optical axis of the printer.

The cylinder 9 is provided at each end with a plurality of axially spaced peripheral grooves 21 for receiving a guide plate member 22. To properly guide photographic paper, the cylinder 9 is provided with two such guide members 22, one at each end, which cooperate with the grooves 21 to guide photographic paper of varying width. Since each of the guide plate members 22 are identical in form and construction, only one will be described for the sake of simplicity. The guide plate member 22 is formed of a single stamping comprising an annular disk 23 having a central opening 24 for receiving the cylinder 9 and a plurality of radially extending fingers 25 as shown dotted in FIG. 2. The end portion 26 of each of the fingers 25 is bent radially inwardly parallel to and spaced apart from the annular disk 23 with the end of the finger substantially in contact with the cylinder 9 to form a U-shaped channel as best seen in FIGS. 3 and 6. A helical spring 27 having a diameter substantially equal to the distance between the end portion 26 and the disk 23 is threaded through the series of channels formed by the fingers 25, and the looped ends of the spring 27 connected together as shown in FIG. 2. The spring 27 when seated within one of the peripheral grooves 21 is under tension and grips the cylinder 9 to hold the guide plate 22 in a guiding position. Moving the guide plate 22 to a different position to accommodate a paper of different width is accomplished by axially sliding the guide plate 22 along the cylinder 9 in either direction causing the disk 23 or the end portion 26 of the fingers, depending upon the direction in which the plate 22 is moved, to urge the spring 27 out of one groove 21 and move it along the cylinder 9 until it seats in another groove 21. Little force is required to move the guide plate 22 along the cylinder 9 primarily because the ends of the fingers 25 which loosely engage the cylinder 9 prevent any tendency of the guide plate 22 to skew. As a result, it is not necessary to apply force to the guide plate 22 evenly along its entire circumference in order to move the guide plate, but rather the pressure may be applied thereto at any single point and still accomplish axial movement of the guide plate 22 with very little effort. Once the guide plate members 22 have been placed on the cylinder 9, retaining rings 28 are mounted in grooves formed by each end of the cylinder 9 to prevent removal of the guide plate members 22 from the cylinder 9.

Normally, photographic paper varies in width in ¼ inch increments. It is preferable in guide rollers of this type to axially space the grooves ¼ inch apart thereby providing a flat portion intermediate the grooves 21 to support the annular disk 23 and end portions 26 of the fingers 25 of the guide plate 22 as best seen in FIG. 6. If the grooves 21 are spaced ⅛ inch apart, no flat portion remains between the grooves 21 and the photographic paper has a tendency to slip underneath the annular disk 23 resulting in misalignment of the paper. Now, spacing the cylinder grooves ¼ inch apart presents a problem with respect to accommodating photographic paper varying in widths by ¼-inch increments, particularly where the longitudinal center line D—D of the photographic paper must be maintained in a fixed position relative to the optical axis of the printer, corresponding to a fixed distance "A" from the mounting plate 1, as seen in FIG. 1 and FIG. 4. With the cylinder grooves 21 spaced ¼ inch apart, the guide roller mechanism 8 can only accommodate photographic paper varying in width by ½-inch increments. More specifically, with the guide mechanism as shown in FIG. 1, a photographic paper of a width 2B inches will be properly guided by the mechanism. If each guide plate 22 is moved axially outwardly to the next groove 21 thereby maintaining the center line D—D of the paper in the same position, that is at a fixed distance "A" from the mounting plate 1, the width of the photographic paper that the guide roller mechanism will now accommodate is (2B+½) inches. Let us assume that the operator, however, desires to use a photographic paper of a width equal to (2B+¼) inches. In that case, the setscrew 17 is backed away releasing the shaft 13, the roller 8 and shaft 13 are moved axially toward the mounting plate 1 until the locking ring 14 engages the end of the bushing 4 which is an axial distance of ⅛ inch, and the setscrew is re-tightened entering the other recess 18 with the mechanism in the position as shown in FIG. 4. The center line of the roller E—E is no longer coincident with the photographic paper center line D—D as in FIG. 1 but is axially spaced therefrom ⅛ inch as seen in FIG. 4. Accordingly, the right guide plate 22 as seen in FIG. 4 is now spaced a distance C from the center line D—D where C is equal to (B+⅛) inches. The left guide plate 22 in FIG. 4, not shown, would on the other hand be spaced a distance (B−⅛) inches from center line D—D. Consequently, the operator would move the left guide plate 22 outwardly ¼ inch to the next adjacent groove 21 so that left guide plate 22 would now also be spaced a distance C from center line D—D, which would be spaced a distance A from plate 1 as seen in FIG. 4. Accordingly, the guide roller mechanism of FIG. 4, with the left plate 22 moved as indicated, will accommodate a photographic paper of a width equal to 2C or (2B+¼) inches.

Although but one embodiment has been illustrated and described, it will be apparent to those skilled in the art that various changes and modifications may be made therein without departing from the spirit of the invention or from the scope of the appended claims.

We claim:

1. In a web guiding mechanism, the combination comprising: a mounting plate; a bushing fixedly secured to said plate; a shaft slidably carried by said bushing and adapted to be releasably secured to said bushing in one of two predetermined positions; a cylinder rotatably mounted on said shaft and having a plurality of axially spaced peripheral grooves at each end thereof which are spaced apart a fixed distance between successive grooves; and a pair of spaced apart guide plate mechanisms carried by said cylinder, each of said guide plate mechanisms selectively cooperating with one of said grooves at one end of said cylinder to guide webs of different widths therebetween, the longitudinal center of said webs being maintained a fixed distance from said mounting plate in each of said predetermined positions of said shaft, the longitudinal center of said cylinder being coincident with the longitudinal center of said webs in one of said predetermined positions and spaced apart therefrom a distance equal to one-half said fixed distance in the other of said predetermined positions.

2. The invention as defined in claim 1 wherein said guide plate mechanism comprises an annular disk mounted on said cylinder and having a plurality of radially extending fingers, the end portion of each of said fingers being bent radially inwardly parallel to and spaced apart a predetermined distance from the remainder of said finger with the end of said finger substantially in engagement with said cylinder to form a U-shaped channel, and a helical spring having an outside diameter substantially equal to said predetermined distance threaded through said channels and around said cylinder with the ends of said spring connected together whereby said spring is under tension and seats within one of said grooves to hold said guide plate mechanism on said cylinder.

3. In a guide plate mechanism adapted to cooperate with peripheral grooves formed at each end of a rotatable cylinder for guiding a web, the combination comprising: an annular disk having a central opening for receiving said cylinder, said disk further having a plurality of radially extending fingers, the end portion of each of said fingers being bent radially inwardly parallel to and spaced apart a predetermined distance from the remainder of said finger with the end of said finger substantially in engagement with said cylinder to form a U-shaped channel, and a helical spring having an outside diameter substantially equal to said predetermined distance threaded through said channels and around said cylinder with the ends of said spring connected together whereby said spring is under tension and seats within one of said grooves to hold said guide plate mechanism on said cylinder.

4. The invention according to claim 1 wherein said bushing is adjustable for properly positioning said shaft and cylinder with respect to said mounting plate.

References Cited in the file of this patent

UNITED STATES PATENTS

| | | |
|---|---|---|
| 687,443 | Succie | Nov. 26, 1901 |
| 862,109 | Roth | July 30, 1907 |
| 1,966,006 | Fisher et al. | July 10, 1934 |
| 2,017,636 | Smalley | Oct. 15, 1935 |
| 2,226,187 | Van Derhoef et al. | Dec. 24, 1940 |
| 2,766,041 | Teplitz | Oct. 9, 1956 |

FOREIGN PATENTS

| | | |
|---|---|---|
| 636,822 | Great Britain | May 10, 1950 |